United States Patent
Takeda et al.

(10) Patent No.: US 10,433,295 B2
(45) Date of Patent: Oct. 1, 2019

(54) USER DEVICE, BASE STATION, SIGNAL RECEPTION METHOD, AND SIGNAL TRANSMISSION METHOD

(71) Applicant: NTT DOCOMO, INC., Tokyo (JP)

(72) Inventors: Kazuaki Takeda, Tokyo (JP); Satoshi Nagata, Tokyo (JP); Qin Mu, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/759,127

(22) PCT Filed: Jan. 6, 2017

(86) PCT No.: PCT/JP2017/000200
§ 371 (c)(1),
(2) Date: Mar. 9, 2018

(87) PCT Pub. No.: WO2017/119467
PCT Pub. Date: Jul. 13, 2017

(65) Prior Publication Data
US 2018/0310281 A1    Oct. 25, 2018

(30) Foreign Application Priority Data
Jan. 8, 2016    (JP) ................................ 2016-003064

(51) Int. Cl.
*H04W 72/04* (2009.01)
*H04W 4/70* (2018.01)
*H04L 1/08* (2006.01)

(52) U.S. Cl.
CPC ............. *H04W 72/042* (2013.01); *H04L 1/08* (2013.01); *H04W 4/70* (2018.02)

(58) Field of Classification Search
CPC .......... H04L 2012/5608; H04W 84/12; H04W 88/06; H04W 88/08; H04W 84/18;
(Continued)

(56) References Cited

U.S. PATENT DOCUMENTS 6,046,990 A    4/2000    Chennakeshu et al.
9,313,680 B2 *    4/2016    Galeev ................. H04L 5/0026
(Continued)

FOREIGN PATENT DOCUMENTS

EP    2 919 402 A1    9/2015
JP    2006-279904 A    10/2006
(Continued)

OTHER PUBLICATIONS

Extended European Search Report issued in European Application No. 17736004.7, dated Dec. 3, 2018 (9 pages).
(Continued)

*Primary Examiner* — Brenda H Pham
(74) *Attorney, Agent, or Firm* — Osha Liang LLP

(57) ABSTRACT

A user device communicates with a base station in a narrowband radio communication system using a physical downlink control channel or a physical downlink shared channel that includes multiple resources of a predetermined unit in a time domain. The user device includes an acquirer that obtains a repetition number indicating a number of times each of the multiple resources is repeatedly and consecutively transmitted in the time domain, and a receiver that receives, from the base station, the physical downlink control channel or the physical downlink shared channel in which each of the multiple resources is consecutively repeated the number of times indicated by the repetition number.

4 Claims, 15 Drawing Sheets

(58) Field of Classification Search
CPC ....... H04W 74/08; H04W 80/04; H04W 8/26; H04W 72/04; H04W 76/00; H04W 84/08; H04W 76/02; H04B 7/2123; H04B 7/212
USPC .... 370/310.2, 328, 338, 349, 322, 329, 341, 370/348
See application file for complete search history.

(56) References Cited

U.S. PATENT DOCUMENTS

| | | | |
|---|---|---|---|
| 2015/0131579 A1 | 5/2015 | Li et al. | |
| 2016/0029358 A1* | 1/2016 | Hou | H04B 7/0695 370/329 |
| 2017/0280483 A1* | 9/2017 | Liu | H04W 36/385 |
| 2018/0092130 A1* | 3/2018 | Yang | H04W 74/08 |

FOREIGN PATENT DOCUMENTS

| | | |
|---|---|---|
| JP | 3879867 B2 | 2/2007 |
| WO | 2015/062557 A1 | 5/2015 |

OTHER PUBLICATIONS

LG Electronics; "Details on SR, SRS, and SPS transmission for MTC UE"; 3GPP TSG RAN WG1 Meeting #83, R1-156848; Anaheim, USA; Nov. 15-22, 2015 (6 pages).

International Search Report of the International Searching Authority issued in PCT/JP2017/000200 dated Mar. 7, 2017 (5 pages).

Written Opinion of the International Searching Authority issued in PCT/JP2017/000200 dated Mar. 7, 2017 (6 pages).

3GPP TS 36.300 V13.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Sep. 2015 (254 pages).

3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).

Qualcomm Incorporated; "New Work Item: NarrowBand IOT (NB-IOT)"; 3GPP TSG RAN Meeting #69, RP-151621; Phoenix, USA; Sep. 14-16, 2015 (9 pages).

Panasonic; "Commonality design between eMTC and NB-IOT"; 3GPP TSG RAN WG1 Meeting #82bis, R1-155776; Malmö, Sweden; Oct. 5-9, 2015 (6 pages).

Japanese Office Action of JP Application No. 2016-003064 dated Feb. 23, 2017 (Notification of Reasons for Refusal) (9 pages).

Japanese Office Action of JP Application No. 2016-003064 dated Oct. 6, 2017 (Decision of Refusal) (7 pages).

Notification of Reasons for Refusal issued in counterpart Japanese Patent Application No. 2018-002967, dated Mar. 19, 2019 (8 Pages).

ZTE; "Considerations on physical data channels for MTC enhancement"; 3GPP TSG RAN WG1 Meeting #80, R1-150143; Athens, Greece, Feb. 9-13, 2015 (7 Pages).

* cited by examiner

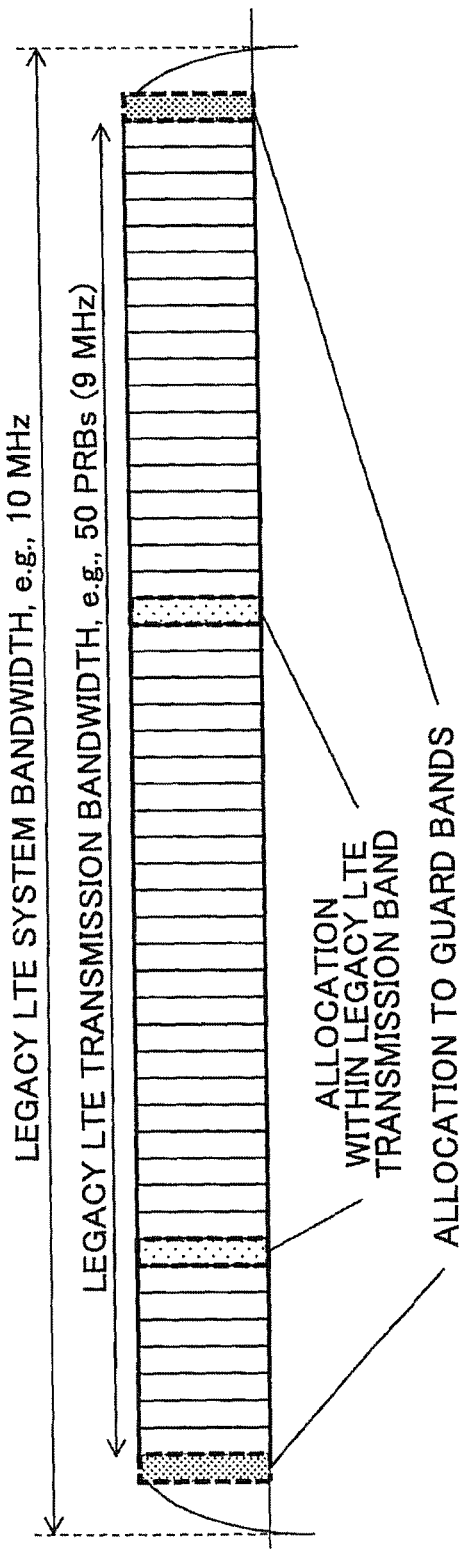

PHYSICAL DOWNLINK
CONTROL CHANNEL

1 DCI
(8 ECCEs)

→ t

PHYSICAL DOWNLINK
SHARED CHANNEL

TB

→ t

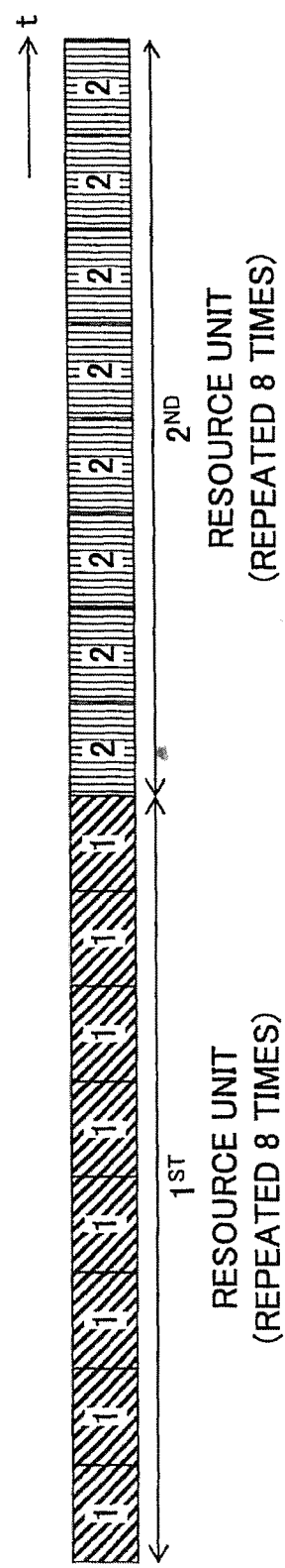

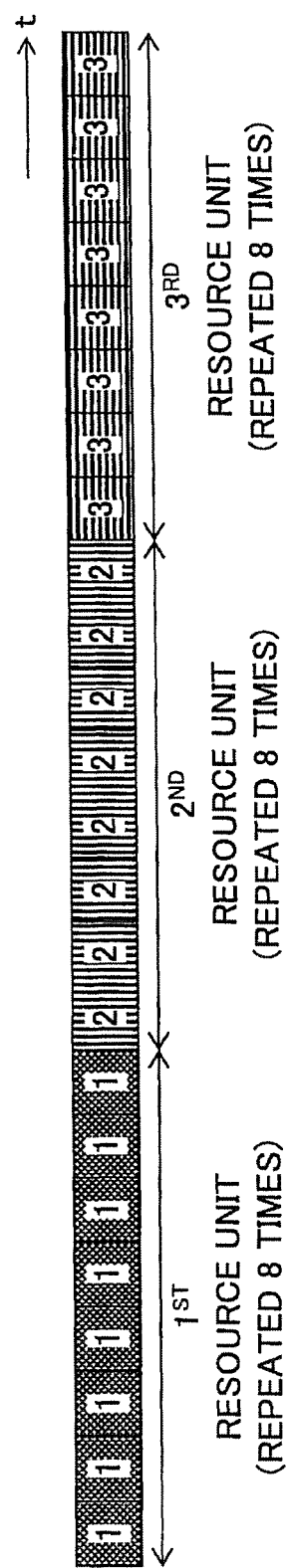

US 10,433,295 B2

USER DEVICE, BASE STATION, SIGNAL RECEPTION METHOD, AND SIGNAL TRANSMISSION METHOD

TECHNICAL FIELD

The present invention relates to a user device, a base station, a signal reception method, and a signal transmission method.

BACKGROUND ART

In the Universal Mobile Telecommunications System (UMTS) network, Long Term Evolution (LTE) has been standardized with an aim to achieve a higher data rate and lower latency (Non-Patent Document 1). Also, to improve LTE in terms of broadband and high-speed communications, successor systems to LTE (e.g., LTE-Advanced (LTE-A), Future Radio Access (FRA), 4G, and 5G) are being considered.

With the decreasing costs of communication apparatuses, the development of technologies for machine-to-machine (M2M) communication, where apparatuses connected to a network communicate with each other and automatically perform control processes without the intervention of humans, is being actively conducted. Particularly, the Third Generation Partnership Project (3GPP) is in the process of standardizing technologies for optimization of Machine Type Communication (MTC) that is a cellular system for M2M communication (Non-Patent Document 2). In the standardization process, functions required for an MTC terminal used for MTC are also being considered. For example, an MTC terminal whose communication bandwidth is limited to reduce costs is being considered. As another example, because it is possible that MTC terminals are placed, for example, in a location deep inside of a building or in a basement where radio communication is difficult, an MTC terminal that can expand coverage is also being considered. Based on the two examples described above, terminals are categorized into the following four types:

1. A terminal whose communication bandwidth is not limited and that includes no coverage expansion function.
2. A terminal whose communication bandwidth is limited and that includes no coverage expansion function.
3. A terminal whose communication bandwidth is not limited and that includes a coverage expansion function.
4. A terminal whose communication bandwidth is limited and that includes a coverage expansion function.

MTC terminals (MTC UE (user equipment)) are expected to be used for a wide range of fields such as an electric meter, a gas meter, a vending machine, a vehicle, and other industrial machines.

RELATED-ART DOCUMENTS

Non-Patent Documents

[Non-Patent Document 1] 3GPP TS 36.300 "Evolved Universal Terrestrial Radio Access (E-UTRA) and Evolved Universal Terrestrial Radio Access Network (E-UTRAN); Overall description; Stage 2"

[Non-Patent Document 2] 3GPP TS 36.888 "Study on provision of low-cost Machine-Type Communications (MTC), User Equipments (UEs) based on LTE (Release 12)"

[Non-Patent Document 3] 3GPP RP-151621 "New Work Item: NarrowBand IOT (NB-IOT)"

DISCLOSURE OF INVENTION

Problems to be Solved by the Invention

In 3GPP Release 13, a study has been started to reduce the costs of an MTC terminal by, for example, limiting the operating frequency band of the MTC terminal to a range less than or equal to 180 kHz (Non-Patent Document 3). A work item (WI) in this study is called NarrowBand-Internet of Things (NB-IoT). NB-IoT aims at achieving a coverage expansion of 20 dB compared with a terminal according to the current General Packet Radio Service (GPRS) and a coverage expansion of 20 dB or more compared with a category 1 terminal specified in the current LTE.

In NB-IoT, to achieve the coverage expansion, it is expected that the same signal is repeatedly transmitted in each of a physical downlink control channel and a physical downlink shared channel. Various methods may be used to repeat a signal. For example, in each of a physical downlink control channel and a physical downlink shared channel, a set of signals of multiple resources to which downlink control information (DCI) or a transport block (TB) is mapped may be simply repeated multiple times. FIG. 1A illustrates an example where a set of signals of resources (resource "1" and resource "2") to which DCI is mapped is simply repeated four times. FIG. 1B illustrates an example where a set of signals of resources (resource "1", resource "2", and resource "3") to which TB is mapped is simply repeated four times.

Generally, when a terminal (or an MTC terminal) demodulates a physical downlink control channel, the terminal performs channel estimation using a reference signal mapped to resources to correct a channel variation amount, and then performs a demodulation process. Accordingly, an MTC terminal for NB-IoT may be configured to combine repeatedly-transmitted signals of resources to secure an SNR of a reference signal sufficient for channel estimation and thereby achieve a coverage expansion.

However, with the repetition transmission method illustrated by FIGS. 1A and 1B, the channel variation amount gradually changes as time passes because the subframe locations at which signals of the same resource are transmitted are apart from each other, and it may become difficult to secure a sufficient SNR of the reference signal. This problem may occur not only in NB-IoT but also in MTC in general.

One object of this disclosure is to solve or reduce the above-described problems, and to provide a technology that makes it possible to achieve a coverage expansion in MTC.

Means for Solving the Problems

In an aspect of this disclosure, there is provided a user device that communicates with a base station in a narrowband radio communication system using a physical downlink control channel or a physical downlink shared channel that includes multiple resources of a predetermined unit in a time domain. The user device includes an acquirer that obtains a repetition number indicating a number of times each of the multiple resources is repeatedly and consecutively transmitted in the time domain; and a receiver that receives, from the base station, the physical downlink control channel or the physical downlink shared channel in which each resource of the multiple resources is consecutively repeated the number of times indicated by the repetition number.

Advantageous Effect of the Invention

An aspect of this disclosure provides a technology that makes it possible to achieve a coverage expansion in MTC.

BRIEF DESCRIPTION OF THE DRAWINGS

FIG. 2 is a drawing illustrating examples of frequency band allocation in NB-IoT;

FIG. 6B is a drawing illustrating an example of a repetition transmission method (1) of a downlink physical control channel;

FIG. 7B is a drawing illustrating an example of a repetition transmission method (1) of a downlink physical shared channel;

DESCRIPTION OF EMBODIMENTS

Figure 1A:
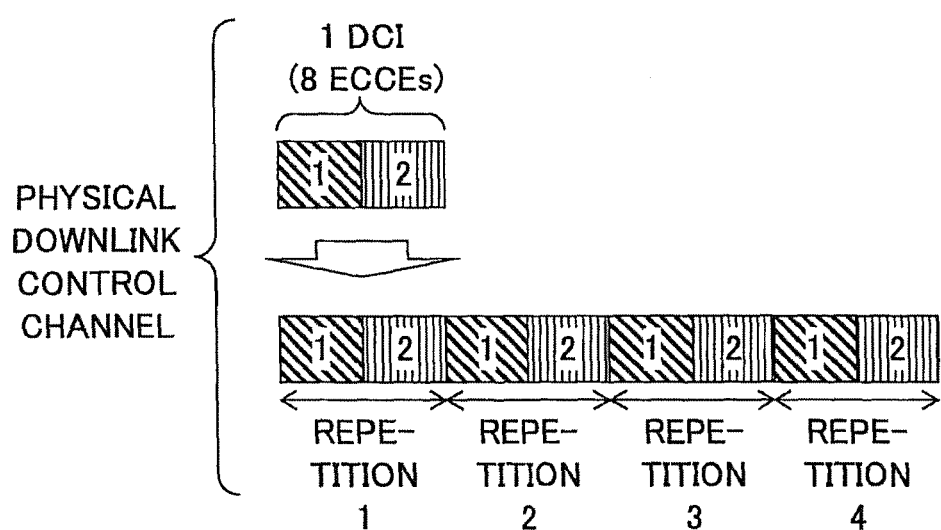
FIG. 1A is a drawing used to describe problems to be solved.

Embodiments of the present invention are described below with reference to the accompanying drawings. Embodiments described below are examples, and the present invention is not limited to those embodiments. For example, although it is assumed that a radio communication system according to the embodiments conforms to LTE, the present invention is not limited to LTE and may also be applied to other types of systems. In the specification and the claims of the present application, "LTE" is used in a broad sense and may indicate not only a communication system corresponding to 3GPP release 8 or 9, but also a fifth-generation communication system corresponding to 3GPP release 10, 11, 12, 13, 14, or later.

Also, although it is assumed that a base station and a user device of embodiments support technologies being studied in NB-IoT, the present invention may also be applied to other communication systems.

In NB-IoT, the bandwidth of one subcarrier is not limited to 15 kHz as in the current LTE, and the use of a narrower bandwidth (e.g., 3.75 kHz) is also being considered. Accordingly, subcarriers used in the embodiments may have a bandwidth other than 15 kHz.

<Outline of NB-IoT>

In NB-IoT, three scenarios are being studied as frequency band allocation methods. In a first scenario, operating frequency bands are set within a transmission band (e.g., 9 MHz) that is actually usable for communications in an LTE system band (e.g., 10 MHz). In a second scenario, guard bands in the LTE system band are set as operating frequency bands. In a third scenario, frequency bands dedicated for NB-IoT are used. FIG. 2 illustrates examples of operating frequency bands that are set according to the first scenario and the second scenario.

In the current LTE, a PRB (a resource composed of 12 subcarriers and 1 slot) is used as a unit of radio resource, and scheduling is performed using a pair of PRBs (1 TTI) as a unit (i.e., one TB is mapped to a resource composed of one pair of PRBs). On the other hand, in NB-IoT where a narrow operating frequency band is used, it is being considered to define a resource unit that is different from a PRB and a PRB pair. For example, a resource unit composed of 1 subcarrier and 12 subframes and a resource unit composed of 6 subcarriers and 6 subframes are being considered. It is also being considered to use the same resource unit (PRB or PRB pair) as in the current LTE. Also, there are proposals to set the resource size of a resource unit such that one TB can be mapped to the resource unit (i.e., a resource size corresponding to the size of a PRB pair in the current LTE), and to set the resource size of a resource unit such that one TB is transmitted using multiple resource units (i.e., a resource size close to the size of one PRB in the current LTE). In the descriptions below, a "resource unit (unit resource)" indicates a resource that is the minimum unit of radio resource scheduling and composed of, for example, one or more subframes (or one or more slots) in the time domain and one through twelve subcarriers in the frequency domain.

Because a narrow operating frequency band is used in NB-IoT, the radio resource in the frequency domain is small. Therefore, to secure a data size that can be mapped to a physical downlink control channel and a physical downlink shared channel, it is expected to use a channel configuration where the physical downlink control channel and the physical downlink shared channel are multiplexed in the time domain (time domain multiplexing: TDM).

Figure 3A:
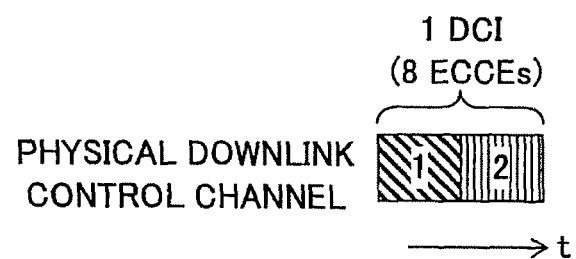
FIG. 3A is a drawing illustrating examples of channel configurations assumed in NB-IoT.
Figure 3B:
FIG. 3B is a drawing illustrating examples of channel configurations assumed in NB-IoT.
Figure 3C:
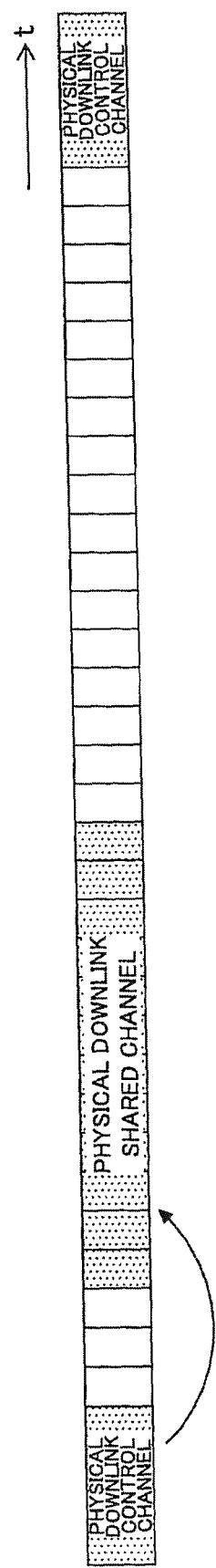
FIG. 3C is a drawing illustrating examples of channel configurations assumed in NB-IoT.

FIGS. 3A through 3C are drawings illustrating examples of channel configurations assumed in NB-IoT. In a scenario expected to be used for a physical downlink control channel in NB-IoT, one set of downlink control information (DCI) is mapped to multiple resource units. In the example of FIG. 3A, one DCI including eight ECCEs is mapped to two resource units. The number of ECCEs is an example, and is not limited to eight. Also, although ECCEs of E-PDCCH are used as an example, CCEs of PDCCH or allocation units of NB-PDCCH being newly considered for NB-IoT may instead be used. Similarly, in a scenario expected to be used for a physical downlink shared channel in NB-IoT, one TB is mapped to multiple resource units as illustrated by FIG. 3B. FIG. 3C illustrates an exemplary channel configuration in NB-IoT where a physical downlink control channel and a physical downlink shared channel are multiplexed in the time domain.

Also in NB-IoT, which aims at expanding the coverage as described above, a scenario, where the same signal or the same information/data is repeatedly transmitted with different redundancy versions (RV) in each of a physical downlink control channel and a physical downlink shared channel, is expected to be used to achieve a sufficient signal to noise ratio (SNR) at a cell edge.

<System Configuration>

Figure 4:
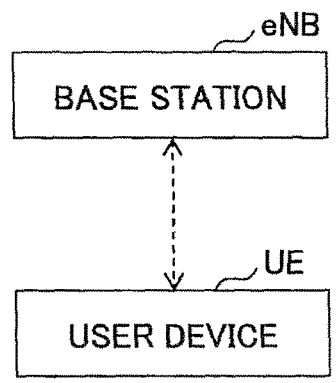
FIG. 4 is a drawing illustrating an example of a configuration of a radio communication system according to an embodiment.

FIG. 4 is a drawing illustrating an example of a configuration of a radio communication system according to an embodiment. As illustrated by FIG. 4, the radio communication system of the present embodiment includes a base station eNB and a user device UE. Although FIG. 4 includes only one base station eNB and one user device UE, the radio communication system may include multiple base stations eNB and multiple user devices UE.

Each of the base station eNB and the user device UE performs downlink (DL) and uplink (UL) communications using a predetermined frequency band (e.g., 180 kHz). As described above, the predetermined frequency band may be a frequency band within a transmission band that is actually usable for communications in an LTE system band, a guard band in the LTE system band, or a frequency band dedicated for NB-IoT. Also, different frequency bands may be allocated for respective user devices UE.

In the present embodiment, it is assumed that a physical downlink control channel used for transmission of downlink control information (DCI) and a physical downlink shared channel used for transmission of, for example, user data (TB) are transmitted and received in the predetermined frequency band. The physical downlink control channel and the physical downlink shared channel of the present embodiment may be referred to as a physical downlink control channel (PDCCH) and a physical downlink shared channel (PDSCH); an MTC PDCCH (MPDCCH) and an MTC PDSCH (MPDSCH); or a narrowband PDCCH (NB-PDCCH) and a narrowband PDSCH (NB-PDSCH), respectively. Also, the physical downlink control channel and the physical downlink shared channel of the present embodiment may be called by any other names.

The base station eNB may be configured to support a communication scheme in the current LTE or to support only functions related to NB-IoT. The user device UE may be referred to as an NB-IoT terminal, an MTC terminal, or a user device UE supporting a limited frequency band.

<Processes>

In the present embodiment, as described above, a "resource unit" indicates a resource that is the minimum unit of radio resource scheduling and composed of, for example, one or more subframes (or one or more slots) in the time domain and one through twelve subcarriers in the frequency domain. The "resource unit" may also be called by any other name. Also, a repeatedly-transmitted "same signal" may indicate signals containing the same information/data and having different RVs. Also, unless otherwise mentioned, a "signal" may indicate a radio signal in general, i.e., a radio signal before modulation or after modulation.

(Process Sequence)

Figure 5:
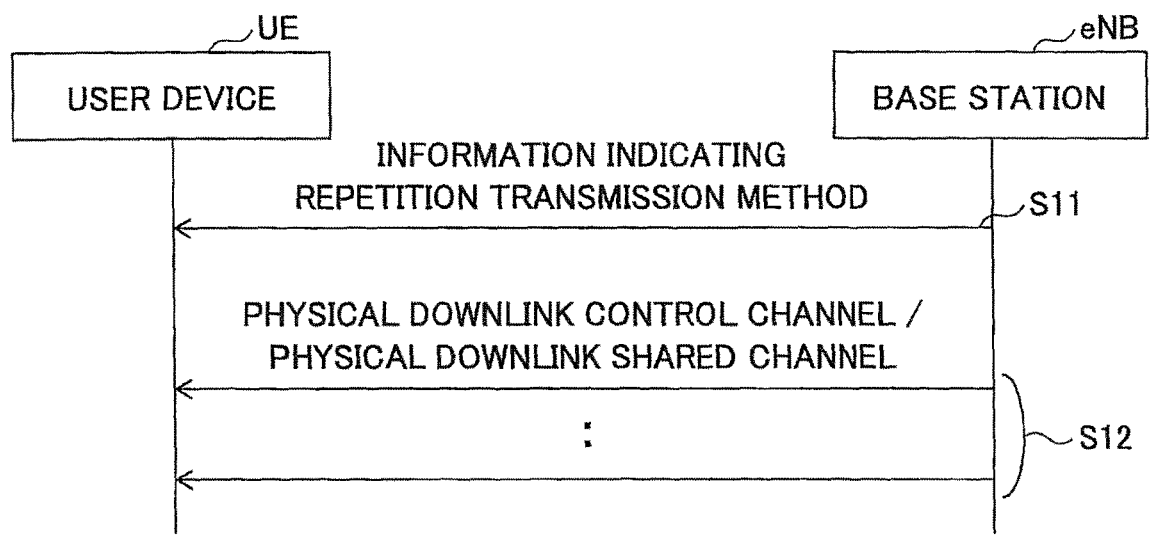
FIG. 5 is a sequence chart illustrating an exemplary process performed by a radio communication system according to an embodiment.

FIG. 5 is a sequence chart illustrating an exemplary process performed by a radio communication system according to an embodiment. In the present embodiment, the base station eNB repeatedly transmits respective signals of multiple resource units to which DCI or TB is mapped, in each of a physical downlink control channel and a physical downlink shared channel according to methods described later. Also, the user device UE combines instances of the repeatedly-transmitted signals of the resource units to secure an SNR of a reference signal sufficient for channel estimation according to methods described later, and demodulates the DCI or the TB.

To perform the above operation, the user device UE obtains, in advance, information (which is hereafter referred to as "repetition transmission method information") indicating a method used by the base station eNB to repeatedly transmit resource units in a physical downlink control channel and a physical downlink shared channel. The "repetition transmission method information" may be preconfigured in the user device UE, may be specified in a 3GPP standard, or may be reported from the base station eNB to the user device UE (S11) using an upper layer signal (e.g., an RRC message or broadcast information). Also, a part of the "repetition transmission method information" may be specified in a 3GPP standard, and the remaining part of the "repetition transmission method information" may be preconfigured in the user device UE or reported from the base station eNB to the user device UE.

The "repetition transmission method information" may include the number of DCI-mapped resource units to which DCI is mapped, the number of times signals of the DCI-mapped resource units are repeatedly transmitted (the number of repetitions of signals of DCI-mapped resource units), the number of TB-mapped resource units to which TB is mapped, the number of times signals of the TB-mapped resource units are repeatedly transmitted (the number of repetitions of signals of TB-mapped resource units), and information (e.g., a subframe number, a subframe number+a radio frame number, or a parameter to be inserted in a predetermined formula used to identify a subframe number and/or a radio frame number) indicating a subframe location at which the transmission of a physical downlink control channel is started.

The base station eNB repeatedly transmits respective signals of DCI-mapped or TB-mapped resource units in each of a physical downlink control channel and a physical downlink shared channel (S12). Also, the base station eNB transmits a reference signal by mapping the reference signal to a predetermined resource element in each resource unit. The reference signal may be mapped to any resource element as long as the location of the resource element is predetermined between the base station eNB and the user device UE. The reference signal may be a cell-specific reference signal (CRS), a UE-specific reference signal (UE-specific RS), and/or a demodulation reference signal (DM-RS).

A part of the "repetition transmission method information" may be transmitted via DCI. For example, the number of repetitions of signals of TB-mapped resource units may be included in DCI to enable dynamic control of the number of repetitions of signals of TB-mapped resource units.

Similarly, the number of repetitions of signals of DCI-mapped resource units may also be included in DCI to enable the user device UE successfully receiving the DCI to identify the number of repetitions.

Also, the maximum number of repetitions (e.g., 100) of signals of TB-mapped resource units may be included in the "repetition transmission method information", and an actual number of repetitions may be included in DCI. This makes it possible to dynamically control the actual number of repetitions of signals of TB-mapped resource units while enabling the user device UE to recognize the number of repetitions that is possible.

Similarly, the maximum number of repetitions (e.g., 100) of signals of DCI-mapped resource units may be included in the "repetition transmission method information", and an actual number of repetitions may be included in DCI. This enables the user device UE successfully receiving the DCI to recognize the actual number of repetitions while enabling the user device UE to recognize the number of repetitions that is possible.

Also, the base station eNB may be configured to include information indicating a subframe location at which transmission of a physical downlink shared channel is started to enable the user device UE to recognize the subframe at which transmission of the physical downlink shared channel is started. Alternatively, the user device UE may be configured to recognize (calculate) the subframe location. For example, the user device UE may be configured to calculate the location of a subframe at which transmission of a physical downlink control channel is completed based on a subframe location at which the transmission of the physical downlink control channel is started and the number of subframes used for the transmission of the physical downlink control channel (e.g., "the number of DCI-mapped resource units"ד"the number of repetitions of signals of DCI-mapped resource units"), and to determine a subframe next to the subframe at which the transmission of the physical downlink control channel is completed (or a subframe after a predetermined number of subframes from the subframe at which the transmission of the physical downlink control channel is completed) as a subframe at which transmission of a physical downlink shared channel is started.

(Repetition Transmission Method (1))

Next, exemplary methods of repeatedly transmitting respective signals of DCI-mapped or TB-mapped resource units in each of a physical downlink control channel and a physical downlink shared channel are described.

In a repetition transmission method (1), the base station eNB repeatedly and consecutively transmits each of the signals of DCI/TB-mapped resource units in a physical downlink control channel or a physical downlink shared channel.

Also, the user device UE combines instances of the repeatedly and consecutively transmitted signal of each of the resource units to obtain a combined signal, and performs channel estimation and channel variation correction using a reference signal included in the combined signal. Next, the user device UE performs a demodulation process on the channel-variation-corrected combined signal of each of the resource units and thereby receives (obtains) DCI or TB.

Figure 6A:
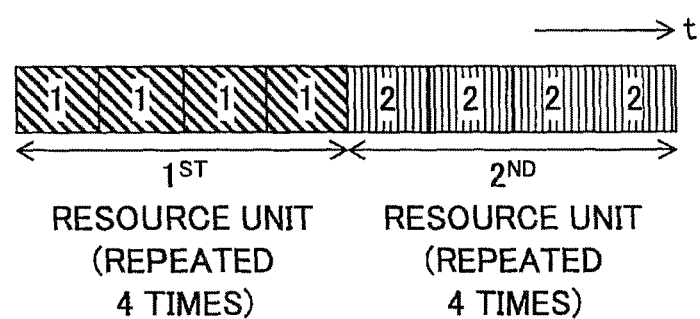
FIG. 6A is a drawing illustrating an example of a repetition transmission method (1) of a downlink physical control channel.

FIGS. 6A and 6B are drawings illustrating examples of the repetition transmission method (1) of a physical downlink control channel. In the examples of FIGS. 6A and 6B, it is assumed that the number of DCI-mapped resource units is two (which corresponds to a case of FIG. 3A). However, the present embodiment may also be applied to a case where the number of DCI-mapped resource units is greater than or equal to three.

FIG. 6A illustrates a case where the number of repetitions of respective signals of DCI-mapped resource units is four. The base station eNB repeatedly transmits the signal of a resource unit "1" of two DCI-mapped resource units four times; and after completing the transmission of the signal of the resource unit "1", repeatedly transmits the signal of a resource unit "2" of the two DCI-mapped resource units four times.

The user device UE receives and combines four instances of the signal of the resource unit "1" to obtain a combined signal of the resource unit "1", and performs channel estimation and channel variation correction on the combined signal of the resource unit "1" using a reference signal included in the combined resource unit "1". Also, the user device UE receives and combines four instances of the signal of the resource unit "2" to obtain a combined signal of the resource unit "2", and performs channel estimation and channel variation correction on the combined signal of the resource unit "2" using a reference signal included in the combined resource unit "2". Next, the user device UE performs a demodulation process on the channel-variation-corrected combined signals of the resource unit "1" and the resource unit "2", and thereby receives (obtains) DCI.

FIG. 6B illustrates a case where the number of repetitions of respective signals of DCI-mapped resource units is eight. Operations of the base station eNB and the user device UE in the case of FIG. 6B are similar to the operations in the case of FIG. 6A, and therefore their descriptions are omitted here.

Figure 7A:
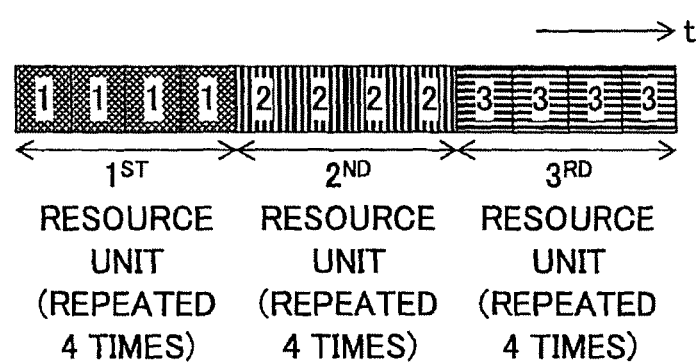
FIG. 7A is a drawing illustrating an example of a repetition transmission method (1) of a downlink physical shared channel.

FIGS. 7A and 7B are drawings illustrating examples of the repetition transmission method (1) of a physical downlink shared channel. In the examples of FIGS. 7A and 7B, it is assumed that the number of TB-mapped resource units is three (which corresponds to a case of FIG. 3B). However, the present embodiment may also be applied to a case where the number of TB-mapped resource units is two or greater than or equal to four.

FIG. 7A illustrates a case where the number of repetitions of respective signals of TB-mapped resource units is four. The base station eNB repeatedly transmits the signal of a resource unit "1" of three TB-mapped resource units four times; and after completing the transmission of the signal of the resource unit "1", repeatedly transmits the signal of a resource unit "2" of the three TB-mapped resource units four times. Also, after completing the transmission of the signal of the resource unit "2", the base station eNB repeatedly transmits the signal of a resource unit "3" four times.

The user device UE receives and combines four instances of the signal of the resource unit "1" to obtain a combined signal of the resource unit "1", and performs channel estimation and channel variation correction on the combined signal of the resource unit "1" using a reference signal included in the combined resource unit "1". Also, the user device UE receives and combines four instances of the signal of the resource unit "2" to obtain a combined signal of the resource unit "2", and performs channel estimation and channel variation correction on the combined signal of the resource unit "2" using a reference signal included in the combined resource unit "2". Also, the user device UE receives and combines four instances of the signal of the resource unit "3" to obtain a combined signal of the resource unit "3", and performs channel estimation and channel variation correction on the combined signal of the resource unit "3" using a reference signal included in the combined resource unit "3". Then, the user device UE performs a demodulation process on the channel-variation-corrected combined signals of the resource unit "1", the resource unit "2", and the resource unit "3", and thereby receives (obtains) TB.

FIG. 7B illustrates a case where the number of repetitions of respective signals of TB-mapped resource units is eight. Operations of the base station eNB and the user device UE in the case of FIG. 7B are similar to the operations in the case of FIG. 7A, and therefore their descriptions are omitted here.

Figure 1B:
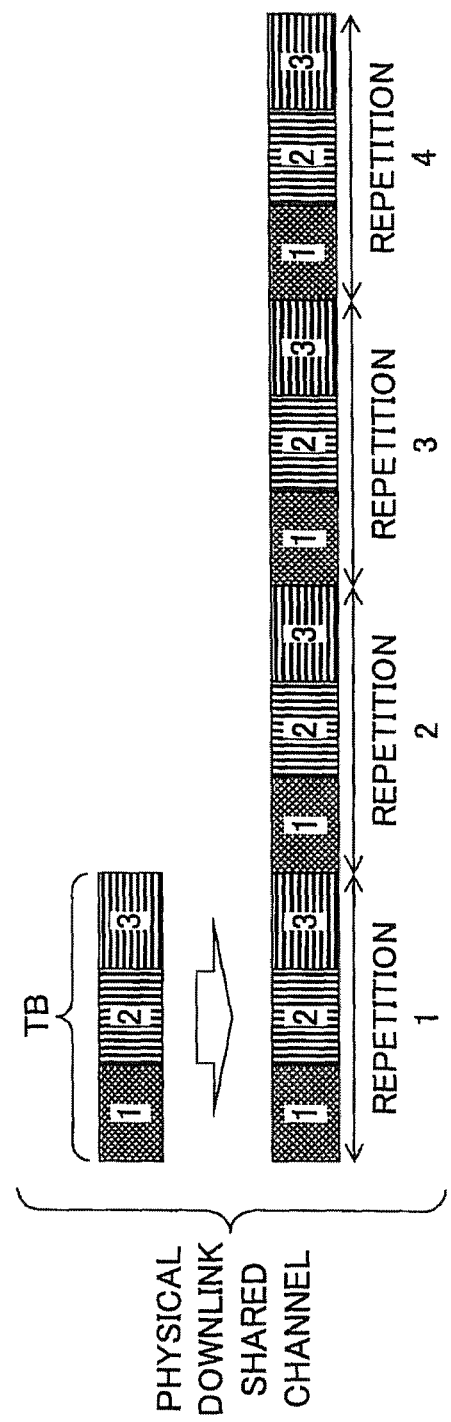
FIG. 1B is a drawing used to describe problems to be solved.

According to the repetition transmission method (1) described above, different from the repetition transmission method of FIGS. 1A and 1B, resource units including the same signal are adjacent to each other in the time domain. Accordingly, the repetition transmission method (1) makes it possible to reduce the channel variation amount between resource units to be combined, secure a sufficient SNR of a reference signal used for channel estimation even at, for example, a cell edge, and thereby achieve a coverage expansion.

(Variation of Repetition Transmission Method (1))

For example, when the number of repetitions is 100 and one resource unit is composed of one subframe in the repetition transmission method (1), signals of 100 resource units are consecutively transmitted within 100 ms and combined. Accordingly, when the number of repetitions is large in the repetition transmission method (1), the channel variation amount may gradually change as time passes, and it may become difficult to secure a sufficient SNR of a reference signal in the combined resource unit. For this reason, the base station eNB may be configured to separately report, to the user device UE, information (e.g., a predetermined upper limit) regarding the number of subframes to be combined to perform channel estimation, by using, for example, an upper layer signal or DCI.

(Repetition Transmission Method (2))

Next, a repetition transmission method (2) is described. With the repetition transmission method (1), when the number of repetitions of respective signals of DCI/TB-mapped resource units is large, the transmission interval between the first resource unit and the last resource unit in consecutive resource units to be combined may become large. For example, when the number of repetitions is 100 and one resource unit is composed of one subframe in the repetition transmission method (1), signals of 100 resource units are consecutively transmitted within 100 ms and combined. In this case, even when a signal can be decoded using less than 100 resource units, it is necessary to receive the entirety of a physical control channel or a physical shared data channel. This in turn makes it difficult to reduce power consumption.

For the above reasons, the repetition transmission method (2) limits the number of resource units used (or combined) by the user device UE to perform channel estimation, and enables the user device UE to obtain DCI or TB without receiving the entirety of a physical control channel or a physical shared data channel. More specifically, the number of resource units used (or combined) by the user device UE to perform channel estimation is defined, for example, as "X", and the value of "X" is shared between the user device UE and the base station eNB in advance. The value of "X" may be included in the "repetition transmission method information". That is, the value of "X" may be preconfigured in the user device UE, may be specified in a 3GPP standard, or may be reported from the base station eNB to the user device UE. Either the same value or different values of "X" may be used for the physical downlink control channel and the physical downlink shared channel. "X" may also be called by any name other than "the number of resource units used (or combined) by the user device UE to perform channel estimation".

In the repetition transmission method (2), the base station eNB repeatedly and consecutively transmits each of the signals of DCI/TB-mapped resource units the number of times indicated by the value of "X" in a physical downlink control channel or a physical downlink shared channel, and repeats this process until the signal of each of DCI/TB-mapped resource units is transmitted the number of times corresponding to "the number of repetitions of each of signals of DCI/TB-mapped resource units".

The user device UE combines "X" instances of the repeatedly and consecutively transmitted signal of each of the resource units to obtain a combined signal, and performs channel estimation and channel variation correction using a reference signal included in the combined signal. Also, after performing this process on each one of the signals of the DCI/TB-mapped resource units, the user device UE performs a demodulation process on each of the channel-variation-corrected combined signals of the resource units and thereby receives (obtains) DCI/TB.

Figure 8A:
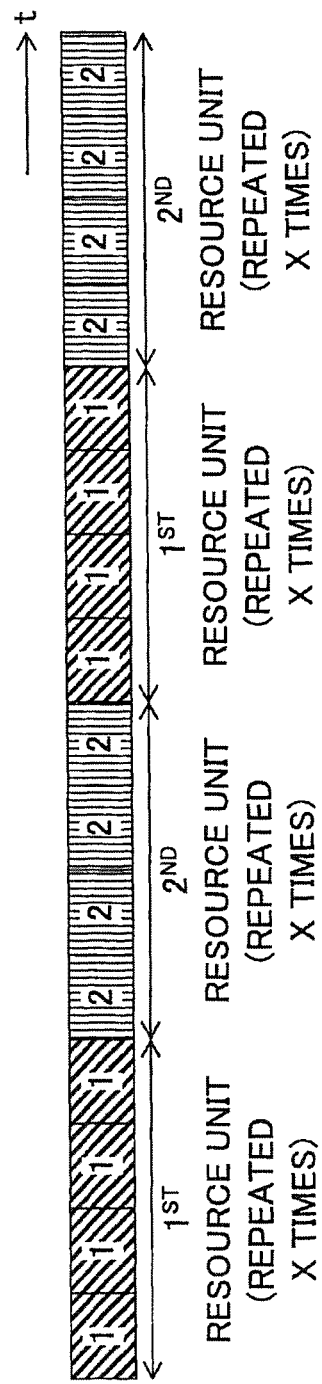
FIG. 8A is a drawing illustrating an example of a repetition transmission method (2) of a downlink physical control channel and a downlink physical shared channel.
Figure 8B:
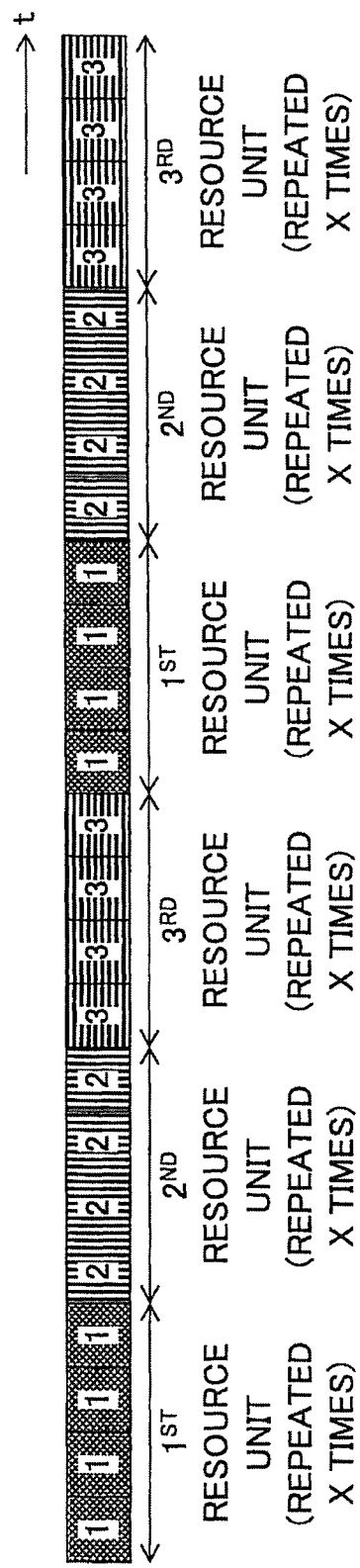
FIG. 8B is a drawing illustrating an example of a repetition transmission method (2) of a physical downlink control channel and a physical downlink shared channel.

FIGS. 8A and 8B are drawings illustrating examples of the repetition transmission method (2) of a physical downlink control channel and a physical downlink shared channel.

FIG. 8A illustrates a case where the number of repetitions of each of signals of DCI-mapped resource units is eight, and the value of "X" is four. The base station eNB repeatedly transmits the signal of a resource unit "1" of two DCI-mapped resource units X times (i.e., four times), and then repeatedly transmits the signal of a resource unit "2" of the two DCI-mapped resource units X times (i.e., four times). Then, once again, the base station eNB repeatedly transmits the signal of the resource unit "1" X times (i.e., four times), and repeatedly transmits the signal of the resource unit "2" X times (i.e., four times).

Thus, in the example of FIG. 8A, although the number of repetitions of each of signals of DCI-mapped resource units is the same as the number of repetitions (i.e., eight) in the example of FIG. 6B, the number of times the same signal of a resource unit is repeatedly and consecutively transmitted in each repetition unit is limited to "X" times (i.e., four times).

The user device UE receives and combines "X" (i.e., four) instances of the signal of the resource unit "1" to obtain a combined signal of the resource unit "1", and performs channel estimation and channel variation correction on the combined signal of the resource unit "1" using a reference signal included in the combined resource unit "1". Also, the user device UE receives and combines "X" (i.e., four) instances of the signal of the resource unit "2" to obtain a combined signal of the resource unit "2", and performs channel estimation and channel variation correction on the combined signal of the resource unit "2" using a reference signal included in the combined resource unit "2". Then, the user device UE performs a demodulation process on the channel-variation-corrected combined signals of the resource unit "1" and the resource unit "2", and thereby receives (obtains) DCI.

If the channel estimation accuracy is low and DCI is not correctly received (obtained), the user device UE repeats the above process until DCI is correctly received (obtained). In the example of FIG. 8A, the user device UE can repeat the above process two times.

FIG. 8B illustrates a case where the number of repetitions of each of signals of TB-mapped resource units is eight, and the value of "X" is four. The base station eNB repeatedly transmits the signal of a resource unit "1" of three TB-mapped resource units X times (i.e., four times), repeatedly transmits the signal of a resource unit "2" of the three DCI-mapped resource units X times (i.e., four times), and repeatedly transmits the signal of a resource unit "3" of the three DCI-mapped resource units X times (i.e., four times). Then, once again, the base station eNB repeatedly transmits the signal of the resource unit "1" X times (i.e., four times), repeatedly transmits the signal of the resource unit "2" X times (i.e., four times), and repeatedly transmits the signal of the resource unit "3" X times (i.e., four times).

Thus, in the example of FIG. 8B, although the number of repetitions of each of signals of TB-mapped resource units is the same as the number of repetitions (i.e., eight) in the example of FIG. 7B, the number of times the same signal of a resource unit is repeatedly and consecutively transmitted in each repetition unit is limited to "X" times (i.e., four times).

The user device UE receives and combines "X" (i.e., four) instances of the signal of the resource unit "1" to obtain a combined signal of the resource unit "1", and performs channel estimation and channel variation correction on the combined signal of the resource unit "1" using a reference signal included in the combined resource unit "1". Also, the user device UE receives and combines "X" (i.e., four) instances of the signal of the resource unit "2" to obtain a combined signal of the resource unit "2", and performs channel estimation and channel variation correction on the combined signal of the resource unit "2" using a reference signal included in the combined resource unit "2". Further, the user device UE receives and combines "X" (i.e., four) instances of the signal of the resource unit "3" to obtain a combined signal of the resource unit "3", and performs channel estimation and channel variation correction on the combined signal of the resource unit "3" using a reference signal included in the combined resource unit "3". Then, the user device UE performs a demodulation process on the channel-variation-corrected combined signals of the resource unit "1", the resource unit "2", and the resource unit "3", and thereby receives (obtains) TB.

If the channel estimation accuracy is low and TB is not correctly received (obtained), the user device UE repeats the above process until TB is correctly received (obtained). In the example of FIG. 8B, the user device UE can repeat the above process two times.

With the repetition transmission method (2) described above, the number of resource units used (or combined) by the user device UE to perform channel estimation is limited to the value of "X". Accordingly, even when the number of repetitions of each of signals of DCI/TB-mapped resource units is large, the repetition transmission method (2) makes it possible to reduce the channel variation amount between resource units to be combined. This in turn makes it possible to secure a sufficient SNR of a reference signal used for channel estimation even at, for example, a cell edge, and thereby makes it possible to achieve a coverage expansion.

Also with the repetition transmission method (2), unlike the repetition transmission method (1), the user device UE does not need to always receive signals of all resource units transmitted from the base station eNB, and can stop receiving signals of resource units transmitted in subframes after DCI or TB is correctly received (or obtained). Thus, compared with the repetition transmission method (1) where the user device UE needs to receive signals of all resource units transmitted from the base station eNB, the repetition transmission method (2) makes it possible to reduce the power consumption of the user device UE.

<Functional Configurations>

Examples of functional configurations of the base station eNB and the user device UE that perform the above processes are described below. Each of the base station eNB and the user device UE of the present embodiment may support both of or one of the repetition transmission method (1) and the repetition transmission method (2). Also, the user device UE may be configured to switch the repetition transmission methods according to, for example, an instruction from the base station eNB.

(Base Station eNB)

Figure 9:
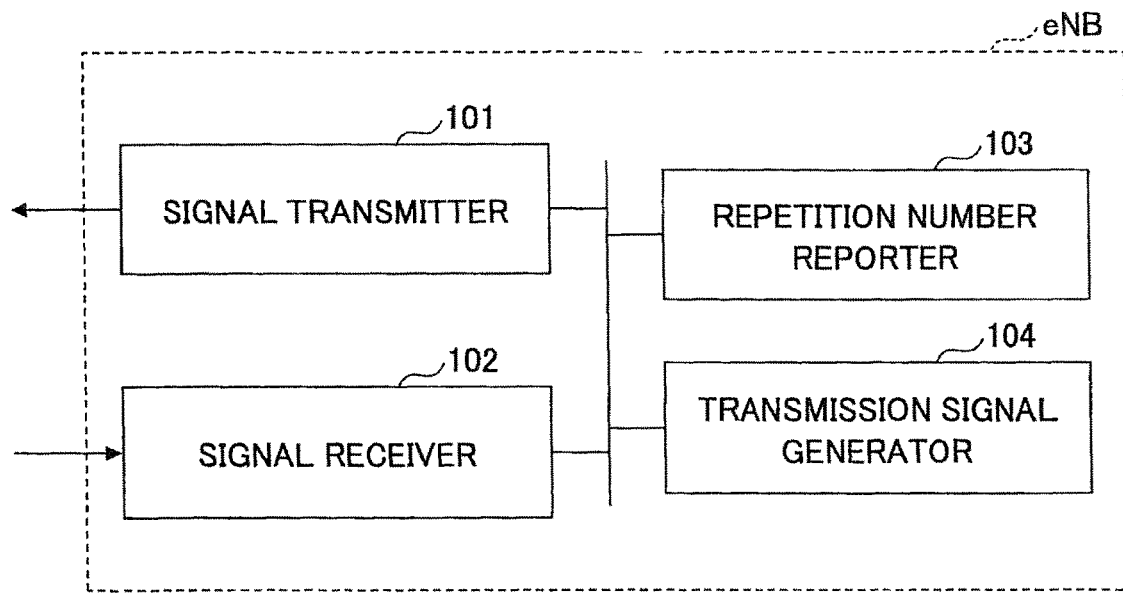
FIG. 9 is a drawing illustrating an example of a functional configuration of a base station according to an embodiment.

FIG. 9 is a drawing illustrating an example of a functional configuration of a base station according to an embodiment. As illustrated by FIG. 9, the base station eNB includes a signal transmitter 101, a signal receiver 102, a repetition number reporter 103, and a transmission signal generator 104. FIG. 9 illustrates only functional components of the base station eNB that are particularly relevant to the present embodiment, and the base station eNB may also at least include unshown functional components that are necessary for operations conforming to LTE. Also, the functional configuration of FIG. 9 is just an example. As long as operations related to the present embodiment can be performed, the categorization and the names of the functional components may be freely changed.

The signal transmitter 101 includes a function to generate a radio signal based on a signal generated by the transmission signal generator 104, and to wirelessly transmit the radio signal. The signal receiver 102 includes a function to wirelessly receive various signals from the user devices UE, and obtain upper layer signals from the received physical layer signals.

It is assumed (as a non-limiting example) that each of the signal transmitter 101 and the signal receiver 102 includes a packet buffer and performs processes in the layer 1 (PHY), the layer 2 (MAC, RLC, PDCP), and the layer 3 (RRC).

The repetition number reporter 103 reports "repetition transmission method information" to the user device UE using, for example, RRC or broadcast information.

The transmission signal generator 104 generates various lower layer signals from upper layer signals to be transmitted from the base station eNB, generates signals by mapping the lower layer signals to resources (resource elements), and inputs the generated signals to the signal transmitter 101. The transmission signal generator 104 may be included in the signal transmitter 101.

Also, the transmission signal generator 104 may be configured to generate a physical downlink control channel or a physical downlink shared channel including multiple resource units in the time domain such that, in the physical downlink control channel or the physical downlink shared channel, each of the signals of the multiple resource units is consecutively repeated the number of times corresponding to "the number of repetitions of each of signals of DCI/TB-mapped resource units".

Also, the transmission signal generator 104 may be configured to generate a physical downlink control channel or a physical downlink shared channel including multiple resource units in the time domain such that, in the physical downlink control channel or the physical downlink shared channel, each of the signals of the multiple resource units is consecutively repeated "X" times in each repetition unit, and is repeated the number of times corresponding to "the number of repetitions of each of signals of DCI/TB-mapped resource units" in total.

(User Device)

Figure 10:
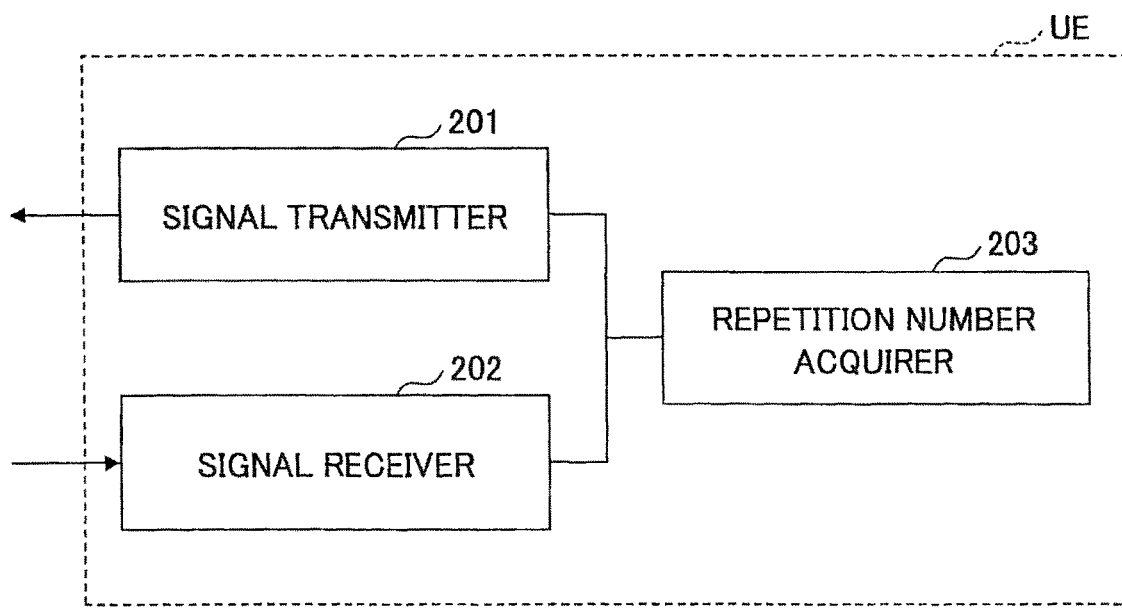
FIG. 10 is a drawing illustrating an example of a functional configuration of a user device according to an embodiment.

FIG. 10 is a drawing illustrating an example of a functional configuration of a user device according to an embodiment. As illustrated by FIG. 10, the user device UE includes a signal transmitter 201, a signal receiver 202, and a repetition number acquirer 203. FIG. 10 illustrates only functional components of the user device UE that are particularly relevant to the present embodiment, and the user device UE may also at least include unshown functional components that are necessary for operations conforming to LTE. Also, the functional configuration of FIG. 10 is just an example. As long as operations related to the present embodiment can be performed, the categorization and the names of the functional components may be freely changed.

The signal transmitter 201 includes a function to generate various signals to be transmitted from the user device UE, and to wirelessly transmit the generated signals. The signal receiver 202 includes a function to receive radio signals from the base station eNB. It is assumed (as a non-limiting example) that each of the signal transmitter 201 and the signal receiver 202 includes a packet buffer and performs processes in the layer 1 (PHY), the layer 2 (MAC, RLC, PDCP), and the layer 3 (RRC).

Also, the signal receiver 202 may be configured to receive a physical downlink control channel or a physical downlink shared channel that includes multiple resource units in the time domain and where each of the signals of the multiple resource units is consecutively repeated the number of times corresponding to "the number of repetitions of each of signals of DCI/TB-mapped resource units". In this case, the signal receiver 202 may be configured to combine instances of the consecutively-repeated signal that correspond to the number of repetitions, and demodulate the combined signal to receive (or obtain) DCI or TB.

Also, the signal receiver 202 may be configured to receive a physical downlink control channel or a physical downlink shared channel that includes multiple resource units in the time domain and where each of the signals of the multiple resource units is consecutively repeated "X" times in each repetition unit, and is repeated the number of times corresponding to "the number of repetitions of each of signals of DCI/TB-mapped resource units" in total. In this case, the signal receiver 202 may be configured to combine "X" instances of the consecutively-repeated signal, and demodulate the combined signal to receive (or obtain) DCI or TB.

Also, the signal receiver 202 performs channel estimation using a reference signal included in the combined signal of each resource unit, and thereby demodulates the combined signal.

The repetition number acquirer 203 obtains "repetition transmission method information" from the base station eNB or a memory of the user device UE.

The entire functional configuration of each of the base station eNB and the user device UE described above may be implemented by a hardware circuit(s) (e.g., one or more IC chips). Alternatively, a part of the functional configuration may be implemented by a hardware circuit(s) and the remaining part of the functional configuration may be implemented by a CPU and programs.

(Base Station)

Figure 11:
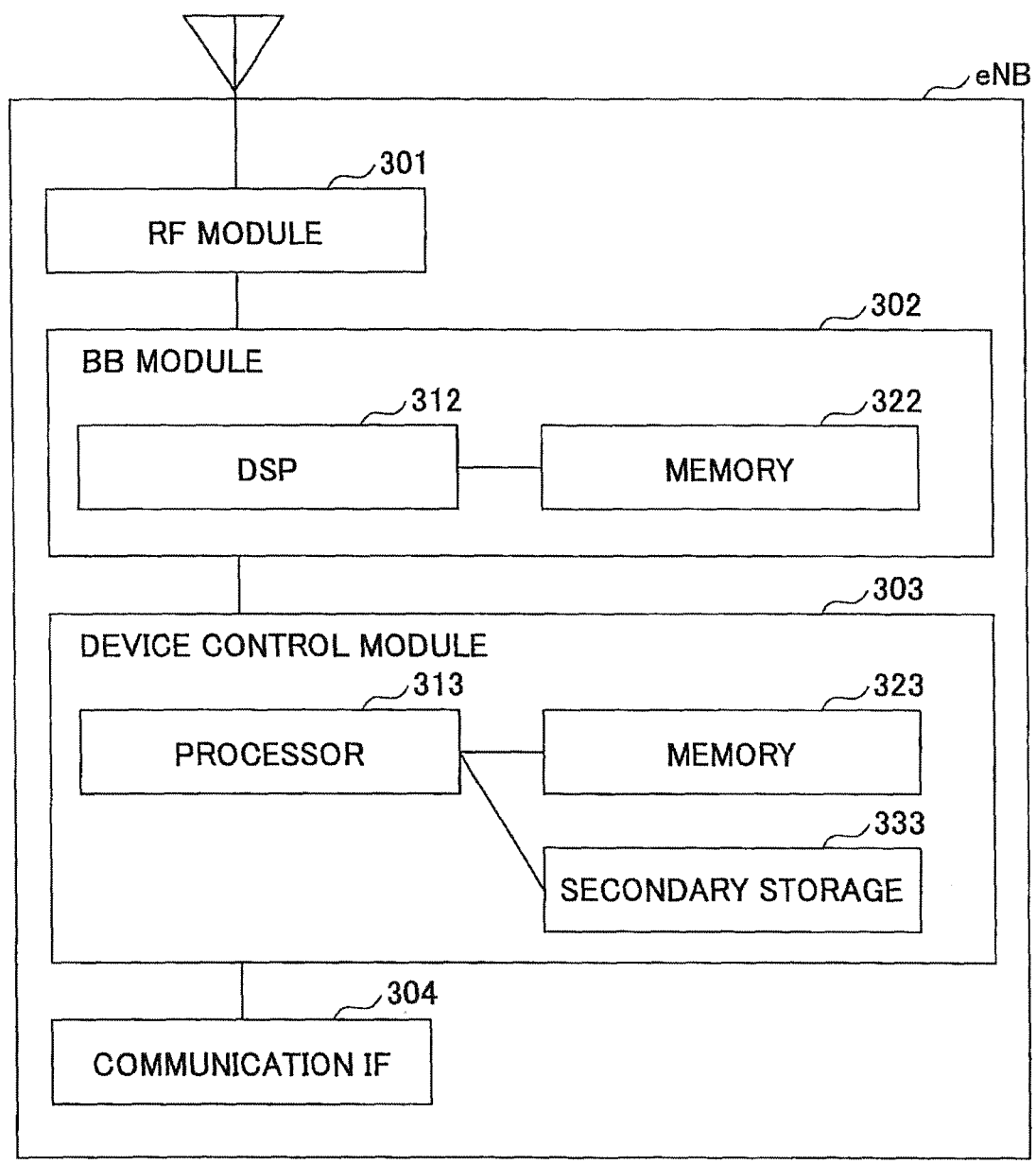
FIG. 11 is a drawing illustrating an example of a hardware configuration of a base station according to an embodiment.

FIG. 11 is a drawing illustrating an example of a hardware configuration of a base station according to an embodiment. FIG. 11 illustrates a configuration that is closer than FIG. 9 to an actual implementation. As illustrated by FIG. 11, the base station eNB includes a radio frequency (RF) module 301 that performs processes related to radio signals, a baseband (BB) processing module 302 that performs baseband signal processing, a device control module 303 that performs processes in upper layers, and a communication IF 304 that is an interface for connection with a network.

The RF module 301 performs processes such as digital-to-analog (D/A) conversion, modulation, frequency conversion, and power amplification on a digital baseband signal received from the BB processing module 302 to generate a radio signal to be transmitted from an antenna. Also, the RF module 301 performs processes such as frequency conversion, analog-to-digital (A/D) conversion, and demodulation on a received radio signal to generate a digital baseband signal, and inputs the digital baseband signal to the BB processing module 302. The RF module 301 may include, for example, a part of the signal transmitter 101 and a part of the signal receiver 102 in FIG. 9.

The BB processing module 302 converts an IP packet into a digital baseband signal and vice versa. A digital signal processor (DSP) 312 is a processor that performs signal processing in the BB processing module 302. A memory 322 is used as a work area of the DSP 312. The BB processing module 302 may include, for example, a part of the signal transmitter 101, a part of the signal receiver 102, and the transmission signal generator 104 in FIG. 9.

The device control module 303 performs protocol processing in the IP layer and operation and maintenance (OAM) processing. A processor 313 performs processes of the device control module 303. A memory 323 is used as a work area of the processor 313. A secondary storage 333 is, for example, an HDD and stores various settings for operations of the base station eNB itself. The device control module 303 may include, for example, the repetition number reporter 103 in FIG. 9.

(User Device)

Figure 12:
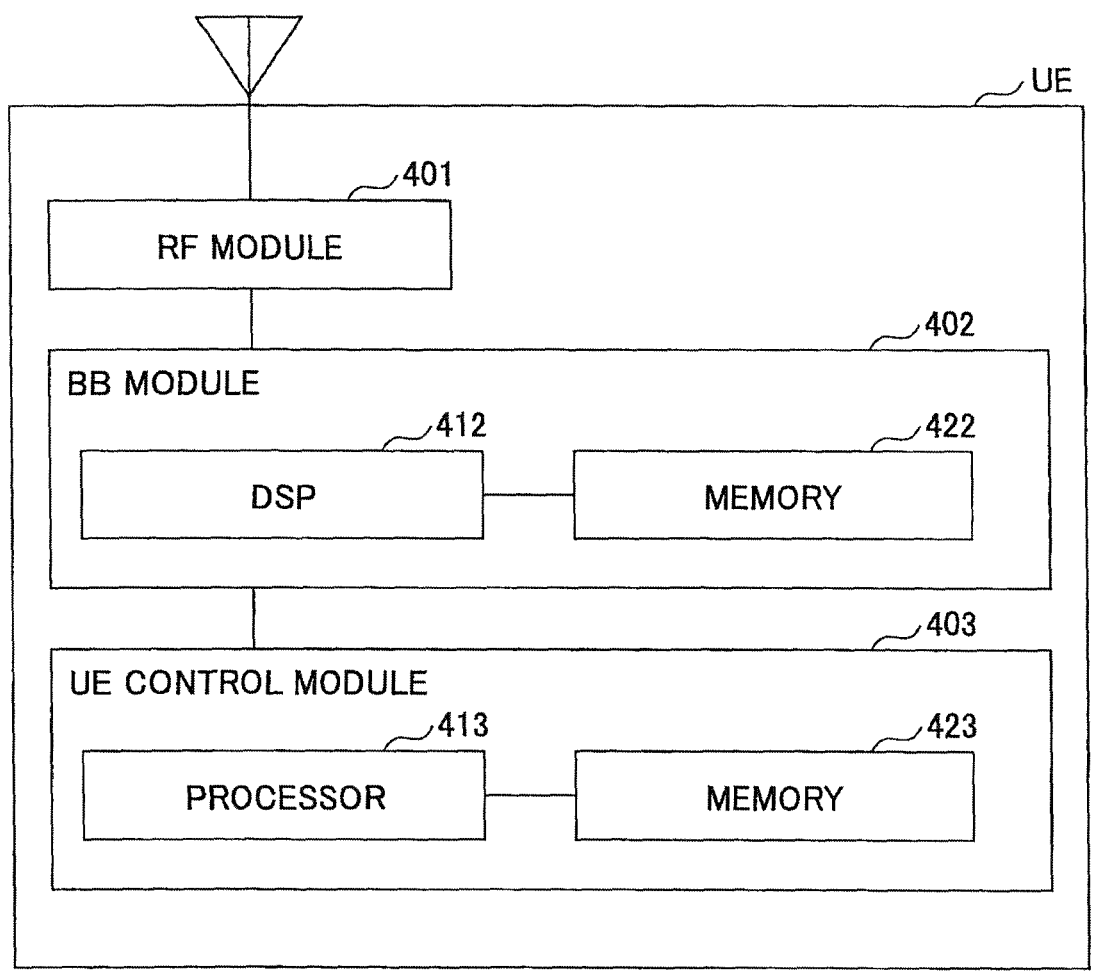
FIG. 12 is a drawing illustrating an example of a hardware configuration of a user device according to an embodiment.

FIG. 12 is a drawing illustrating an example of a hardware configuration of a user device according to an embodiment. FIG. 12 illustrates a configuration that is closer than FIG. 10 to an actual implementation. As illustrated by FIG. 12, the user device UE includes an RF module 401 that performs processes related to radio signals, a BB processing module 402 that performs baseband signal processing, and a UE control module 403 that performs processes in upper layers.

The RF module 401 performs processes such as D/A conversion, modulation, frequency conversion, and power amplification on a digital baseband signal received from the BB processing module 402 to generate a radio signal to be transmitted from an antenna. Also, the RF module 401 performs processes such as frequency conversion, A/D conversion, and demodulation on a received radio signal to generate a digital baseband signal, and inputs the digital baseband signal to the BB processing module 402. The RF module 401 may include, for example, a part of the signal transmitter 201 and a part of the signal receiver 202 in FIG. 10.

The BB processing module 402 converts an IP packet into a digital baseband signal and vice versa. A DSP 412 is a processor that performs signal processing in the BB processing module 402. A memory 422 is used as a work area of the DSP 412. The BB processing module 402 may include, for example, a part of the signal transmitter 201 and a part of the signal receiver 202 in FIG. 10.

The UE control module 403 performs protocol processing in the IP layer and processes related to applications. A processor 413 performs processes of the UE control module 403. A memory 423 is used as a work area of the processor 413. The UE control module 403 may include, for example, the repetition number acquirer 203 in FIG. 10.

<Summary>

An embodiment of the present invention provides a user device that communicates with a base station in a narrowband radio communication system using a physical downlink control channel or a physical downlink shared channel that includes multiple resources of a predetermined unit in a time domain. The user device includes an acquirer that obtains a repetition number indicating a number of times each of the multiple resources is repeatedly and consecutively transmitted in the time domain; and a receiver that receives, from the base station, the physical downlink control channel or the physical downlink shared channel in which each resource of the multiple resources is consecutively repeated the number of times indicated by the repetition number, combines signals of the consecutively-repeated resource corresponding to the repetition number to obtain a combined signal, and demodulates the combined signal. This user device UE provides a technology that makes it possible to achieve a coverage expansion in MTC.

Another embodiment of the present invention provides a user device that communicates with a base station in a narrowband radio communication system using a physical downlink control channel or a physical downlink shared channel that includes multiple resources of a predetermined unit in a time domain. The user device includes an acquirer that obtains a repetition number indicating a number of times each of the multiple resources is repeatedly transmitted in the time domain, and information indicating a predetermined resource number; and a receiver that receives, from the base station, the physical downlink control channel or the physical downlink shared channel in which each resource of the multiple resources is consecutively repeated a number of times indicated by the predetermined resource number in each repetition unit and is repeated a number of times indicated by the repetition number in total, combines signals of the consecutively-repeated resource corresponding to the predetermined resource number to obtain a combined signal, and demodulates the combined signal. This user device UE provides a technology that makes it possible to achieve a coverage expansion in MTC.

A reference signal may be mapped to each of the multiple resources constituting the physical downlink control channel or the physical downlink shared channel, and the receiver may be configured to demodulate the combined signal by performing channel estimation using the reference signal included in the combined signal. This configuration enables the user device UE to secure an SNR of a reference signal that is sufficient for channel estimation.

The radio communication system may use a narrowband of 180 kHz or less, and each of the multiple resources may be composed of one or more subframes or one or more slots and one through twelve subcarriers.

Another embodiment of the present invention provides a base station that communicates with a user device in a narrowband radio communication system using a physical downlink control channel or a physical downlink shared channel that includes multiple resources of a predetermined unit in a time domain. The base station includes a generator that generates the physical downlink control channel or the physical downlink shared channel in which each of the multiple resources is consecutively repeated a predetermined number of times; and a transmitter that transmits the generated physical downlink control channel or physical downlink shared channel to the user device. This base station eNB provides a technology that makes it possible to achieve a coverage expansion in MTC.

Another embodiment of the present invention provides a base station that communicates with a user device in a narrowband radio communication system using a physical downlink control channel or a physical downlink shared channel that includes multiple resources of a predetermined unit in a time domain. The base station includes a generator that generates the physical downlink control channel or the physical downlink shared channel in which each of the multiple resources is consecutively repeated a number of times indicated by a predetermined resource number in each repetition unit and is repeated a number of times indicated by a predetermined repetition number in total; and a transmitter that transmits the generated physical downlink control channel or physical downlink shared channel to the user device. This base station eNB provides a technology that makes it possible to achieve a coverage expansion in MTC.

An embodiment of the present invention provides a signal reception method performed by a user device that communicates with a base station in a narrowband radio communication system using a physical downlink control channel or a physical downlink shared channel that includes multiple resources of a predetermined unit in a time domain. The signal reception method includes obtaining a repetition number indicating a number of times each of the multiple resources is repeatedly and consecutively transmitted in the time domain; receiving, from the base station, the physical downlink control channel or the physical downlink shared channel in which each resource of the multiple resources is consecutively repeated the number of times indicated by the repetition number; and combining signals of the consecutively-repeated resource corresponding to the repetition number to obtain a combined signal, and demodulating the combined signal. This signal reception method provides a technology that makes it possible to achieve a coverage expansion in MTC.

Another embodiment of the present invention provides a signal reception method performed by a user device that communicates with a base station in a narrowband radio communication system using a physical downlink control channel or a physical downlink shared channel that includes multiple resources of a predetermined unit in a time domain. The signal reception method includes obtaining a repetition number indicating a number of times each of the multiple resources is repeatedly transmitted in the time domain, and information indicating a predetermined resource number; receiving, from the base station, the physical downlink control channel or the physical downlink shared channel in which each resource of the multiple resources is consecutively repeated a number of times indicated by the predetermined resource number in each repetition unit and is repeated a number of times indicated by the repetition number in total; and combining signals of the consecutively-repeated resource corresponding to the predetermined resource number to obtain a combined signal, and demodulating the combined signal. This signal reception method provides a technology that makes it possible to achieve a coverage expansion in MTC.

Another embodiment of the present invention provides a signal transmission method performed by a base station that communicates with a user device in a narrowband radio communication system using a physical downlink control channel or a physical downlink shared channel that includes multiple resources of a predetermined unit in a time domain. The signal transmission method includes generating the physical downlink control channel or the physical downlink shared channel in which each of the multiple resources is consecutively repeated a predetermined number of times; and transmitting the generated physical downlink control channel or physical downlink shared channel to the user device. This signal transmission method provides a technology that makes it possible to achieve a coverage expansion in MTC.

Another embodiment of the present invention provides a signal transmission method performed by a base station that communicates with a user device in a narrowband radio communication system using a physical downlink control channel or a physical downlink shared channel that includes multiple resources of a predetermined unit in a time domain. The signal transmission method includes generating the physical downlink control channel or the physical downlink shared channel in which each of the multiple resources is consecutively repeated a number of times indicated by a predetermined resource number in each repetition unit and is repeated a number of times indicated by a predetermined repetition number in total; and transmitting the generated physical downlink control channel or physical downlink shared channel to the user device. This signal transmission method provides a technology that makes it possible to achieve a coverage expansion in MTC.

Supplementary Description of Embodiments

Receiving a physical downlink control channel or a physical downlink shared channel may be rephrased as receiving a signal of a physical downlink control channel or a signal of a physical downlink shared channel.

Components of each apparatus (the user device UE, the base station eNB) described in the above embodiments may be implemented by executing a program stored in a memory by a CPU (processor) of the apparatus, may be implemented by hardware such as hardware circuits including logic for the above-described processes, or may be implemented by a combination of programs and hardware.

Embodiments of the present invention are described above. However, the present invention is not limited to the above-described embodiments, and a person skilled in the art may understand that variations, modifications, and replacements may be made to the above embodiments. Although specific values are used in the above descriptions to facilitate the understanding of the present invention, the values are just examples and other appropriate values may also be used unless otherwise mentioned. Grouping of subject matter in the above descriptions is not essential for the present invention. For example, subject matter described in two or more sections may be combined as necessary, and subject matter described in one section may be applied to subject matter described in another section unless they contradict each other. Boundaries of functional units or processing units in functional block diagrams do not necessarily correspond to boundaries of physical components. Operations of multiple functional units may be performed by one physical component, and an operation of one functional unit may be performed by multiple physical components. The order of steps in sequence charts and flowcharts described in the embodiments may be changed unless they do not become inconsistent. Although functional block diagrams are used to describe the user device UE and the base station eNB, the user device UE and the base station eNB may be implemented by hardware, software, or a combination of them. Software to be executed by a processor of the user device UE and software to be executed by a processor of the base station eNB according to the embodiments of the present invention may be stored in any appropriate storage medium such as a random access memory (RAM), a flash memory, a read-only memory (ROM), an EPROM, an EEPROM, a register, a hard disk drive (HDD), a removable disk, a CD-ROM, a database, or a server.

In the above embodiments, the number of resource units used (or combined) by the user device UE to perform channel estimation is an example of "information indicating a predetermined resource number". A resource unit is an example of a "resource of a predetermined unit" and a "resource".

Information may also be reported using methods other than those described in the above embodiments. For example, information may be reported by physical layer signaling (e.g., downlink control information (DCI), uplink control information (UCI)), upper layer signaling (e.g., RRC signaling, MAC signaling, broadcast information (master information block (MIB), system information block (SIB))), other signals, or a combination of them. An RRC message may also be referred to as RRC signaling. Also, an RRC message may be, for example, an RRC connection setup message or an RRC connection reconfiguration message.

The above-described embodiments may be applied to a system employing LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-Wideband), Bluetooth (registered trademark), or any other appropriate system, and/or a next generation system implemented by extending any one of these systems.

Decision or judgment may be performed based on a one-bit value (0 or 1) or a truth value (Boolean: true or false), or by the comparison of values (e.g., comparison with a predetermined value).

Terms described in the present application and/or terms necessary to understand the present application may be replaced with terms having the same or similar meanings. For example, a channel and/or a symbol may be replaced with a signal. Also, a signal may be replaced with a message.

Depending on persons skilled in the art, UE may be called by any other appropriate term such as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client.

The above-described embodiments may be used separately or in any combination, and may also be switched during a process. Predetermined information (e.g., "A is X") may be reported explicitly or implicitly (e.g., by not reporting the predetermined information).

In the present application, the term "determining" may indicate various operations. For example, "determining" may indicate that one of "calculating", "computing", "processing", "deriving", "investigating", "looking up" (e.g., searching a data structure such as a table or a database), and "ascertaining" has been performed. Also, "determining" may indicate that one of "receiving" (e.g., reception of information), "transmitting" (e.g., transmission of information), "inputting", "outputting", and "accessing" (e.g., accessing data in a memory) has been performed. Further, "determining" may indicate that one of "resolving", "selecting", "choosing", establishing", and "comparing" has been performed. Thus, "determining" may indicate that an operation has been performed.

In the present application, "based on" does not mean "based only on" unless otherwise mentioned. In other words, "based on" can mean both "based only on" and "based at least on".

The order of steps in sequence charts and flowcharts described in the embodiments may be changed unless they do not become inconsistent. For example, the order of steps in a method described in the embodiments is an example and may be changed to any appropriate order.

Input/output information may be stored in a specific location (e.g., in a memory), or may be managed using a management table. Input/output information may be overwritten, updated, or added. Output information may be removed. Input information may be transmitted to another apparatus.

Predetermined information (e.g., "A is X") may be reported explicitly or implicitly (e.g., by not reporting the predetermined information).

Information and signals described in the present application may be represented by using various different technologies. For example, data, instructions, commands, information, signals, bits, symbols, and chips in the above descriptions may be represented by voltages, electric currents, electromagnetic waves, magnetic fields, magnetic particles, optical fields, photons, or any combination of them.

The present international application is based on and claims the benefit of priority of Japanese Patent Application No. 2016-003064 filed on Jan. 8, 2016, the entire contents of which are hereby incorporated herein by reference.

EXPLANATION OF REFERENCE NUMERALS

UE User device
eNB Base station
101 Signal transmitter
102 Signal receiver
103 Repetition number reporter
104 Transmission signal generator
201 Signal transmitter
202 Signal receiver
203 Repetition number acquirer
301 RF module
302 BB processing module
303 Device control module
304 Communication IF
401 RF module
402 BB processing module
403 UE control module

The invention claimed is:

1. A user device that communicates with a base station in a narrowband radio communication system using a physical downlink control channel or a physical downlink shared channel that includes multiple resources of a predetermined unit in a time domain, the user device comprising:
    a processor that obtains a repetition number indicating a number of times each of the multiple resources is repeatedly transmitted in the time domain, and information indicating a predetermined resource number; and
    a receiver that receives, from the base station, the physical downlink control channel or the physical downlink shared channel in which each of the multiple resources is consecutively repeated a number of times indicated by the predetermined resource number in each repetition unit and is repeated a number of times indicated by the repetition number in total,
    wherein a reference signal is mapped to each of the multiple resources constituting the physical downlink control channel or the physical downlink shared channel, and
    the receiver performs demodulation by performing channel estimation using the received reference signal.

2. The user device as claimed in claim 1, wherein
    the radio communication system uses a narrowband of 180 kHz; and
    each of the multiple resources is composed of one or more subframes or one or more slots and one through twelve subcarriers.

3. A base station that communicates with a user device in a narrowband radio communication system using a physical downlink control channel or a physical downlink shared channel that includes multiple resources of a predetermined unit in a time domain, the base station comprising:
    a processor that generates the physical downlink control channel or the physical downlink shared channel in which each of the multiple resources is consecutively repeated a number of times indicated by a predetermined resource number reported to the user device in each repetition unit and is repeated a number of times indicated by a predetermined repetition number in total; and
    a transmitter that transmits the generated physical downlink control channel or physical downlink shared channel to the user device,
    wherein a reference signal is mapped to each of the multiple resources constituting the physical downlink control channel or the physical downlink shared channel, and
    the user device performs demodulation by performing channel estimation using the received reference signal.

4. A signal reception method performed by a user device that communicates with a base station in a narrowband radio communication system using a physical downlink control channel or a physical downlink shared channel that includes multiple resources of a predetermined unit in a time domain, the signal reception method comprising:
    obtaining a repetition number indicating a number of times each of the multiple resources is repeatedly transmitted in the time domain, and information indicating a predetermined resource number;
    receiving, from the base station, the physical downlink control channel or the physical downlink shared channel in which each of the multiple resources is consecutively repeated a number of times indicated by the predetermined resource number in each repetition unit and is repeated a number of times indicated by the repetition number in total;
    mapping a reference signal to each of the multiple resources constituting the physical downlink control channel or the physical downlink shared channel; and
    performing demodulation by performing channel estimation using the received reference signal.

* * * * *